(12) United States Patent
Mine

(10) Patent No.: US 9,122,125 B2
(45) Date of Patent: Sep. 1, 2015

(54) IMAGE-CAPTURING APPARATUS AND METHOD OF CONTROLLING THE SAME

(75) Inventor: Yosuke Mine, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 13/432,481

(22) Filed: Mar. 28, 2012

(65) Prior Publication Data

US 2012/0257081 A1    Oct. 11, 2012

(30) Foreign Application Priority Data

Apr. 5, 2011    (JP) .................................. 2011-084079

(51) Int. Cl.
| | |
|---|---|
| H04N 5/228 | (2006.01) |
| G03B 7/097 | (2006.01) |
| H04N 5/235 | (2006.01) |
| H04N 5/347 | (2011.01) |
| G03B 7/28 | (2006.01) |

(52) U.S. Cl.
CPC ...... *G03B 7/097* (2013.01); *G03B 7/28* (2013.01); *H04N 5/2351* (2013.01); *H04N 5/2353* (2013.01); *H04N 5/2355* (2013.01); *H04N 5/347* (2013.01)

(58) Field of Classification Search
None
See application file for complete search history.

(56) References Cited

U.S. PATENT DOCUMENTS

| | | | |
|---|---|---|---|
| 2004/0151488 A1* | 8/2004 | Osawa .......................... | 396/213 |
| 2006/0238621 A1* | 10/2006 | Okubo et al. ............ | 348/208.99 |
| 2008/0253758 A1* | 10/2008 | Yap et al. ...................... | 396/234 |
| 2010/0182444 A1* | 7/2010 | Kroepfl et al. ............. | 348/222.1 |
| 2010/0245622 A1* | 9/2010 | Muramatsu ................ | 348/229.1 |
| 2011/0013040 A1* | 1/2011 | Han et al. ................... | 348/222.1 |
| 2011/0128435 A1* | 6/2011 | Ikeda ........................... | 348/362 |

FOREIGN PATENT DOCUMENTS

| | | |
|---|---|---|
| JP | 06-130462 | 5/1994 |
| JP | 2000-050168 A | 2/2000 |
| JP | 2006-352715 A | 12/2006 |
| JP | 2009-010694 A | 1/2009 |

OTHER PUBLICATIONS

The above foreign patent documents were cited in the Feb. 9, 2015 Japanese Office Action, which is enclosed without an English Translation, that issued in Japanese Patent Application No. 2011-084079.

* cited by examiner

*Primary Examiner* — Twyler Haskins
*Assistant Examiner* — Wesley J Chiu
(74) *Attorney, Agent, or Firm* — Cowan, Liebowitz & Latman, P.C.

(57) ABSTRACT

An exposure control value is calculated based on a first photometric value calculated based on first image data read out from an image sensor and a second photometric value calculated based on second image data read out from the image sensor, and wherein the first image data is obtained without or with adding pixel signals and the second image data is obtained by adding a number of pixel signals larger than pixel the number of signals added to obtain the first image data.

11 Claims, 8 Drawing Sheets

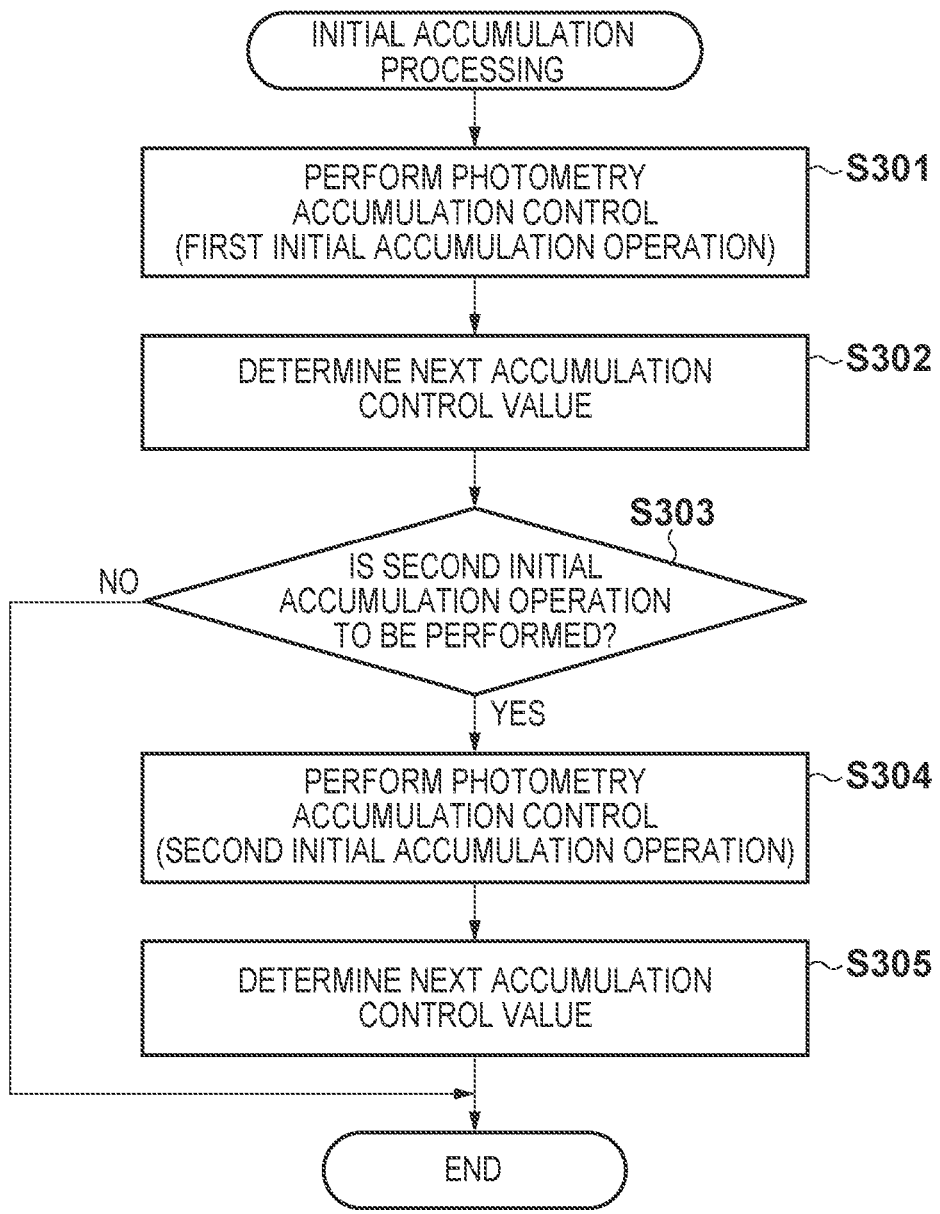

PHOTOMETRIC AREA
2 × 2 PIXELS
(16 PIXELS ARE ADDED
FOR EACH COLOR FILTER)

PHOTOMETRIC AREA
1 × 1 PIXELS
(64 PIXELS ARE ADDED
FOR EACH COLOR FILTER)

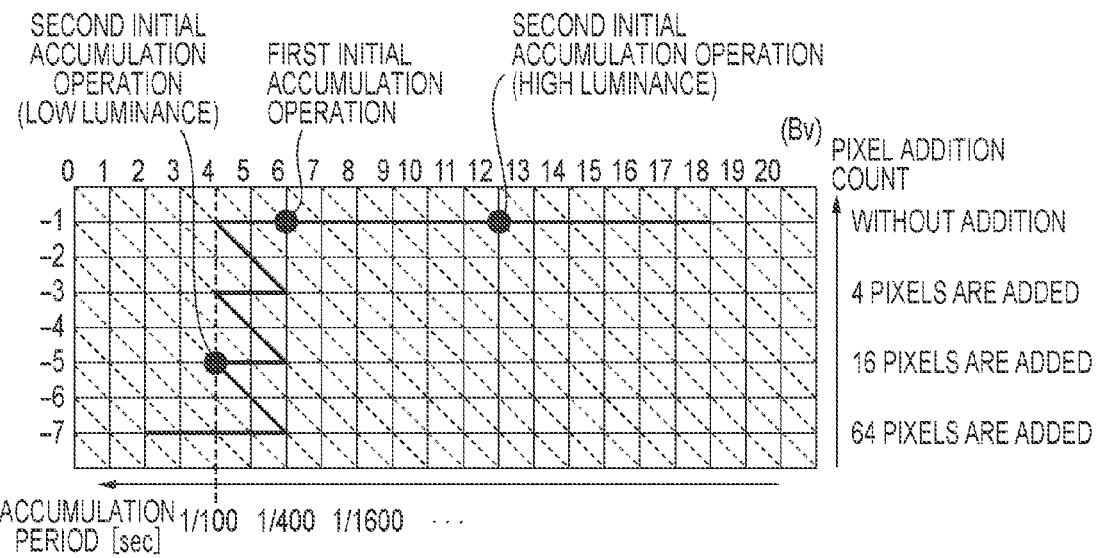
FIG. 6A  INITIAL PROGRAM DIAGRAM
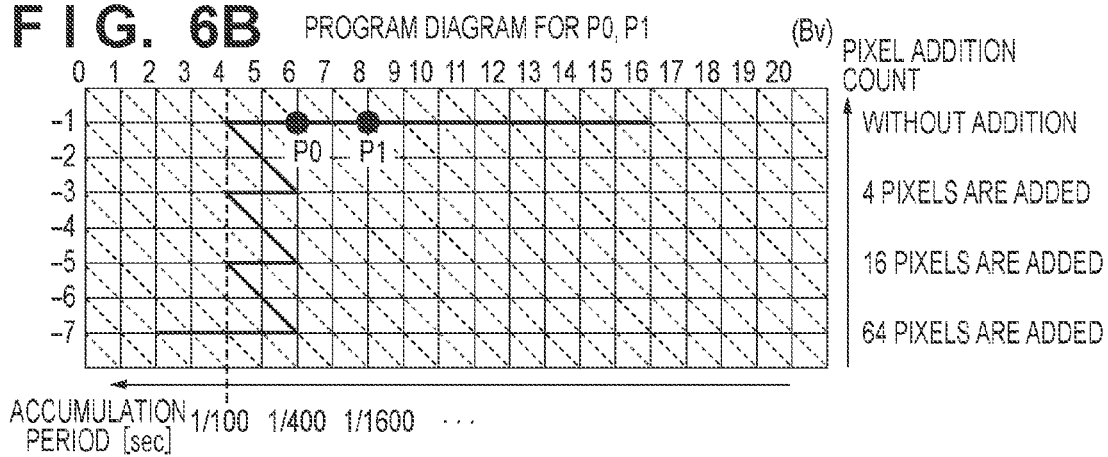
FIG. 6B  PROGRAM DIAGRAM FOR P0, P1
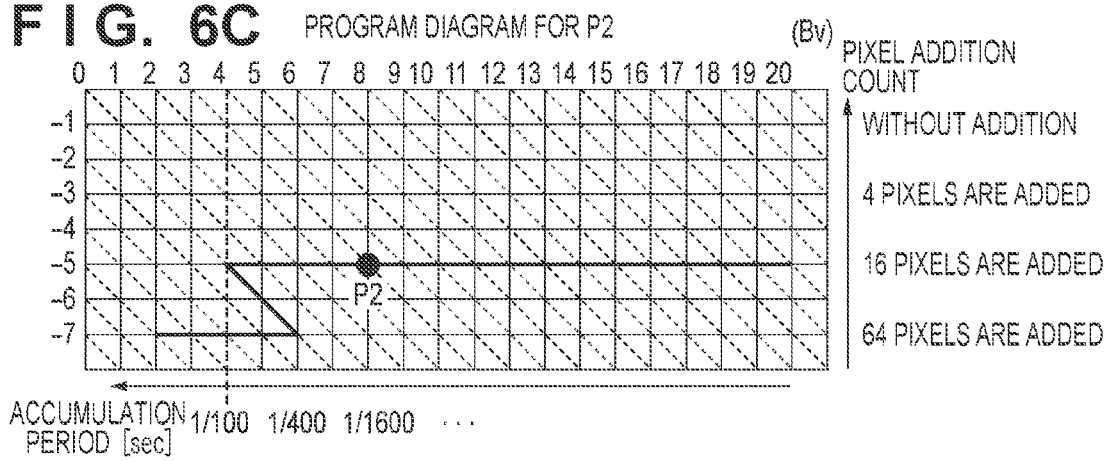
FIG. 6C  PROGRAM DIAGRAM FOR P2

IMAGE-CAPTURING APPARATUS AND METHOD OF CONTROLLING THE SAME

BACKGROUND OF THE INVENTION

1. Field of the Invention

The present invention relates to an image-capturing apparatus and a method of controlling the same and, more particularly, to an image-capturing apparatus which performs photometry using a charge-accumulation type image sensor, and a method of controlling the same.

2. Description of the Related Art

The photometric range required for an image-capturing apparatus such as a digital camera or a digital video camera is generally Bv values of about −5 to +15 in APEX units. That is, the dynamic range of the photometric range is about 20 steps. On the other hand, the dynamic range in which photometry can be performed by one-time accumulation using a charge-accumulation type image sensor is narrower than 20 steps.

Hence, with a known technique, a charge-accumulation type image sensor is used to combine image signals obtained by capturing images of the same scene by a plurality of times using different exposure amounts, thereby generating an image having a dynamic range wider than that which can be attained by one-time accumulation (image capturing). Such a technique is so-called HDR (High Dynamic Range) imaging.

Widening of the dynamic range of a photometric device which employs a charge-accumulation type light-receiving element in the same way has also been proposed. In, for example, Japanese Patent Laid-Open No. 6-130462, a photometric device which employs a charge-accumulation type light-receiving element alternately performs photometry that uses a long accumulation period and photometry that uses a short accumulation period, thereby obtaining photometric values from a low-luminance region to a high-luminance region even if the difference in luminance in the field is very large.

However, the method described in Japanese Patent Laid-Open No. 6-130462 requires a long exposure time to perform image capturing for photometry in a low-luminance region, thus prolonging the time required for photometry.

SUMMARY OF THE INVENTION

The present invention has been made in consideration of the above-mentioned conventional problem, and provides an image-capturing apparatus which achieves both widening of the photometric range using a charge-accumulation type image sensor and suppression of prolongation of the time required for photometry, and a method of controlling the same.

According to an aspect of the present invention, there is provided an image-capturing apparatus comprising: an image sensor including a plurality of pixels; a photometry calculation unit which calculates a photometric value based on image data read out from the image sensor; and an exposure calculation unit which calculates an exposure control value based on the photometric value calculated by the photometry calculation unit, wherein the exposure calculation unit calculates the exposure control value based on a first photometric value calculated based on first image data read out from the image sensor and a second photometric value calculated based on second image data read out from the image sensor, and wherein the first image data is obtained without or with adding pixel signals and the second image data is obtained by adding a number of pixel signals larger than the number of pixel signals added to obtain the first image data.

According to another aspect of the present invention, there is provided a method of controlling an image-capturing apparatus, comprising: a photometry calculation step of calculating a photometric value based on image data read out from an image sensor including a plurality of pixels; and an exposure calculation step of calculating an exposure control value based on the photometric value calculated in the photometry calculation step, wherein, in the exposure calculation step, an exposure control value is calculated based on a first photometric value calculated based on first image data read out from the image sensor and a second photometric value calculated based on second image data read out from the image sensor, and wherein the first image data is obtained without or with adding pixel signals and the second image data is obtained by adding a number of pixel signals larger than pixel the number of signals added to obtain the first image data.

Further features of the present invention will become apparent from the following description of exemplary embodiments with reference to the attached drawings.

BRIEF DESCRIPTION OF THE DRAWINGS

FIG. 4 is a flowchart for explaining initial accumulation processing of the digital still camera according to the embodiment of the present invention;

FIGS. 5A to 5F are views for explaining a method of setting the pixel addition range of the digital still camera according to the embodiment of the present invention;

FIGS. 6A to 6C are views illustrating examples of program diagrams used to determine control values for use in photometry accumulation control of the digital still camera according to the embodiment of the present invention.

DESCRIPTION OF THE EMBODIMENTS

Exemplary embodiments of the present invention will now be described in detail in accordance with the accompanying drawings.

(Configuration of Camera 10)

Figure 1:
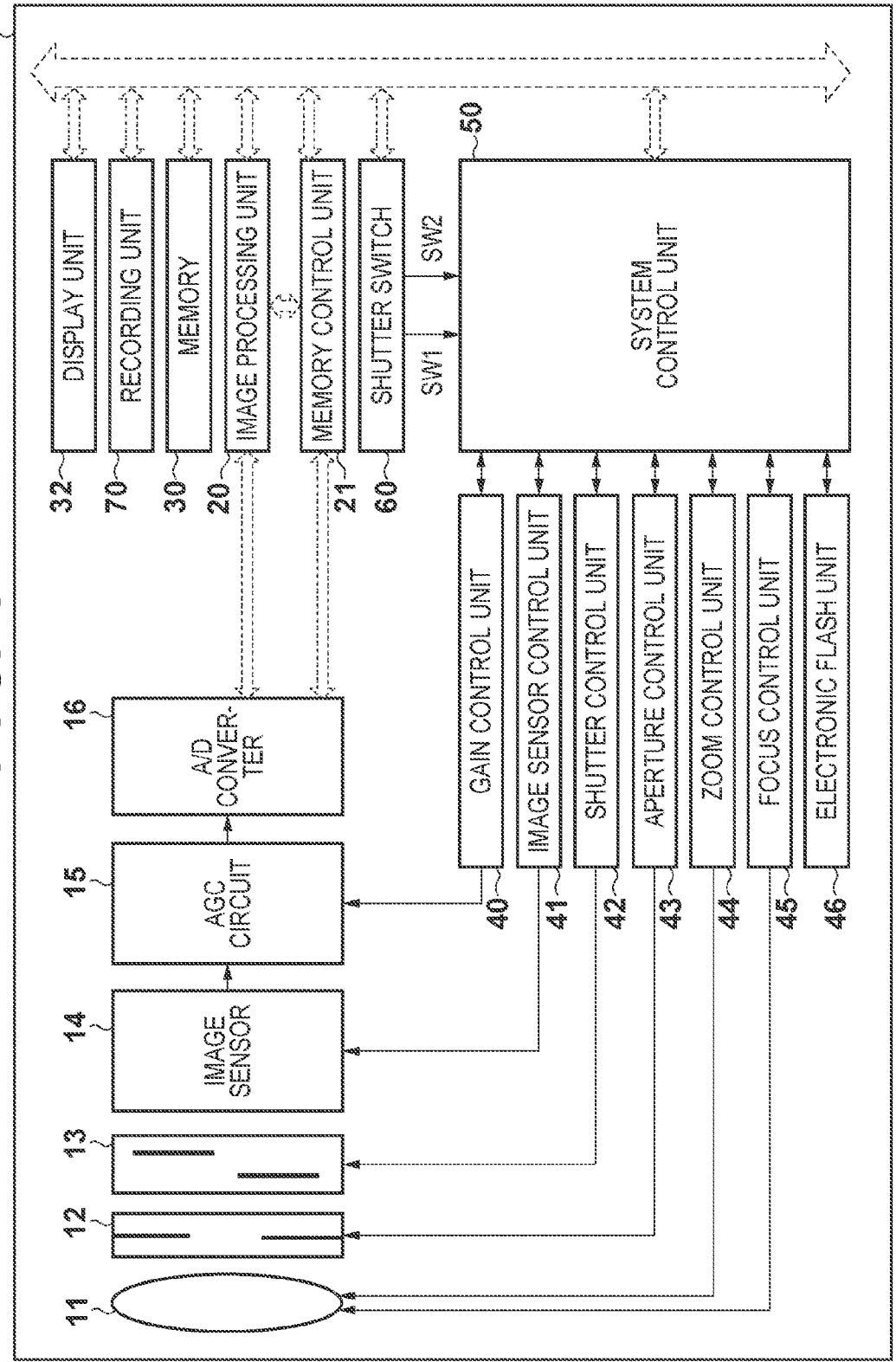
FIG. 1 is a block diagram illustrating an example of the configuration of a digital still camera which exemplifies an image-capturing apparatus according to an embodiment of the present invention.

FIG. 1 is a block diagram illustrating an example of the configuration of a digital still camera (to be simply referred to as a camera hereinafter) 10 which exemplifies an image-capturing apparatus according to an embodiment of the present invention.

Imaging lenses 11 include an autofocus mechanism and zoom mechanism in this embodiment, and not only the zoom mechanism can be driven in accordance with a control signal from a zoom control unit 44, but also a focus lens can be driven in accordance with a control signal from a focus control unit 45.

An aperture 12 has an opening with a size which varies in accordance with a control signal from an aperture control unit 43, and controls the amount of light incident on an image sensor.

A shutter 13 opens/closes in accordance with a control signal from a shutter control unit 42 to control the exposure time of the image sensor.

A charge-accumulation type image sensor 14 serves as, for example, a CMOS image sensor. The image sensor 14 performs photoelectric conversion for each pixel to accumulate charges, converts an optical image into an electrical signal (image data), and outputs it, in accordance with a control signal from an image sensor control unit 41.

An AGC circuit 15 performs gain adjustment corresponding to a control signal from a gain control unit 40 for the image data output from the image sensor 14, and outputs image data having undergone gain adjustment to an A/D converter 16.

The A/D converter 16 A/D-converts the image data having undergone gain adjustment from the AGC circuit 15. The A/D-converted image data is written in a memory 30 via both an image processing unit 20 and a memory control unit 21 or via only the memory control unit 21.

The image processing unit 20 performs, for example, pixel correction processing, color conversion processing, AF (AutoFocus) processing, AE (AutoExposure) processing, EF (Electronic Flash pre-emission) processing, and AWB (Auto White Balance) processing for the image data from the A/D converter 16 or memory control unit 21.

A system control unit 50 controls the gain control unit 40, the image sensor control unit 41, the shutter control unit 42, the aperture control unit 43, the zoom control unit 44, the focus control unit 45, and an electronic flash unit 46 based on the calculation result obtained by the image processing unit 20.

The gain control unit 40 controls the gain of the AGC circuit 15. The image sensor control unit 41 controls the accumulation period of the image sensor 14 and the pixel addition count. The shutter control unit 42 controls the opening/closing operation of the shutter 13. The aperture control unit 43 controls the size of the opening of the aperture 12. The zoom control unit 44 controls zooming of the imaging lenses 11. The focus control unit 45 drives the focus lens of the imaging lenses 11 to control the focal position.

The electronic flash unit 46 has an AF auxiliary light projection function and electronic flash control function.

The system control unit 50 includes, for example, a CPU, ROM, and RAM and controls the operation of the overall camera 10. Note that the system control unit 50 may at least partially control the gain control unit 40, image sensor control unit 41, shutter control unit 42, aperture control unit 43, zoom control unit 44, and focus control unit 45 described above.

The memory 30 stores, for example, constants, variables, and programs for operating the system control unit 50.

A display unit 32 serves as, for example, an LCD and displays, for example, a menu screen and various types of information of the camera 10 in accordance with control of the system control unit 50. Also, the camera 10 according to this embodiment continuously captures images and displays the captured images on the display unit 32 in an image-capturing standby state, thereby causing the display unit 32 to function as an electronic viewfinder.

A shutter switch 60 includes shutter switches SW1 and SW2. The shutter switch SW1 is turned on by a half stroke of a shutter button (not shown), and the shutter switch SW2 is turned on by a full stroke of the shutter button.

The system control unit 50 detects ON of the shutter switch SW1 as an instruction to start image-capturing preparation processing, and starts operations such as AF (AutoFocus) processing and AE (AutoExposure) processing.

Also, the system control unit 50 detects ON of the shutter switch SW2 as an instruction to start final image-capturing (recording image-capturing) processing. In the final image-capturing processing, in an electronic flash image-capturing mode, the system control unit 50 controls light emission of the electronic flash unit 46 and performs an exposure process of exposing the image sensor 14 at an F-number and shutter speed (exposure time) corresponding to AE processing.

The system control unit 50 writes image data obtained by the image sensor 14 in the memory 30 via the A/D converter 16 and memory control unit 21. Also, the system control unit 50 performs development processing (e.g., color interpolation processing) for the image data present in the memory 30 using the calculation result obtained by the image processing unit 20. Moreover, the system control unit 50 executes recording processing of reading out the developed image data from the memory 30 and writing it on a recording medium provided in a recording unit 70 in the format of, for example, an image file. Note that the system control unit 50 encodes image data as needed.

The recording unit 70 includes a recording medium such as a semiconductor memory card, and reads/writes data from/on the recording medium in accordance with control of the system control unit 50.

(Operation of Camera 10)

The operation of the camera 10 will be described next with reference to flowcharts shown in FIGS. 2 to 4. Note that the camera 10 is ON, that is, in an image-capturing standby state in this case. The camera 10 continuously captures images in an image-capturing standby state, and the display unit 32 functions as an electronic viewfinder, as described above. A captured image displayed when the display unit 32 functions as an electronic viewfinder will be referred to as a through image hereinafter.

In step S101, the system control unit 50 determines whether the shutter switch SW1 is ON or OFF. If the shutter switch SW1 is ON, the system control unit 50 advances the process to step S102.

In step S102, the system control unit 50 causes the image processing unit 20 to execute image processing for image data of a through image to perform AE processing. Note the AE processing will be described in detail later with reference to FIG. 3.

In step S103, the system control unit 50 performs AF (AutoFocus) processing of the known contrast detection method using the image data of the through image. The system control unit 50 causes the image processing unit 20 to calculate an AF evaluation value from the image data of the through image, and drives the focus lens of the imaging lenses 11 via the focus control unit 45, thereby searching for a focus lens position at which the AF evaluation value is maximized. The system control unit 50 drives the focus lens to the focus lens position at which the AF evaluation value is maximized.

In step S104, the system control unit 50 determines whether the shutter switch SW2 is ON or OFF. If the shutter switch SW2 is OFF, the system control unit 50 checks the state of the shutter switch SW1 in step S105. If the shutter switch SW1 is still ON, the system control unit 50 returns the process to step S102. If the shutter switch SW1 has already been turned off, the system control unit 50 returns the process to step S101.

If the system control unit 50 determines in step S104 that the shutter switch SW2 is ON, in step S106 it executes the above-mentioned final image-capturing processing based on exposure control values calculated in the AE processing of step S102.

(Details of AE Processing)

Figure 2:
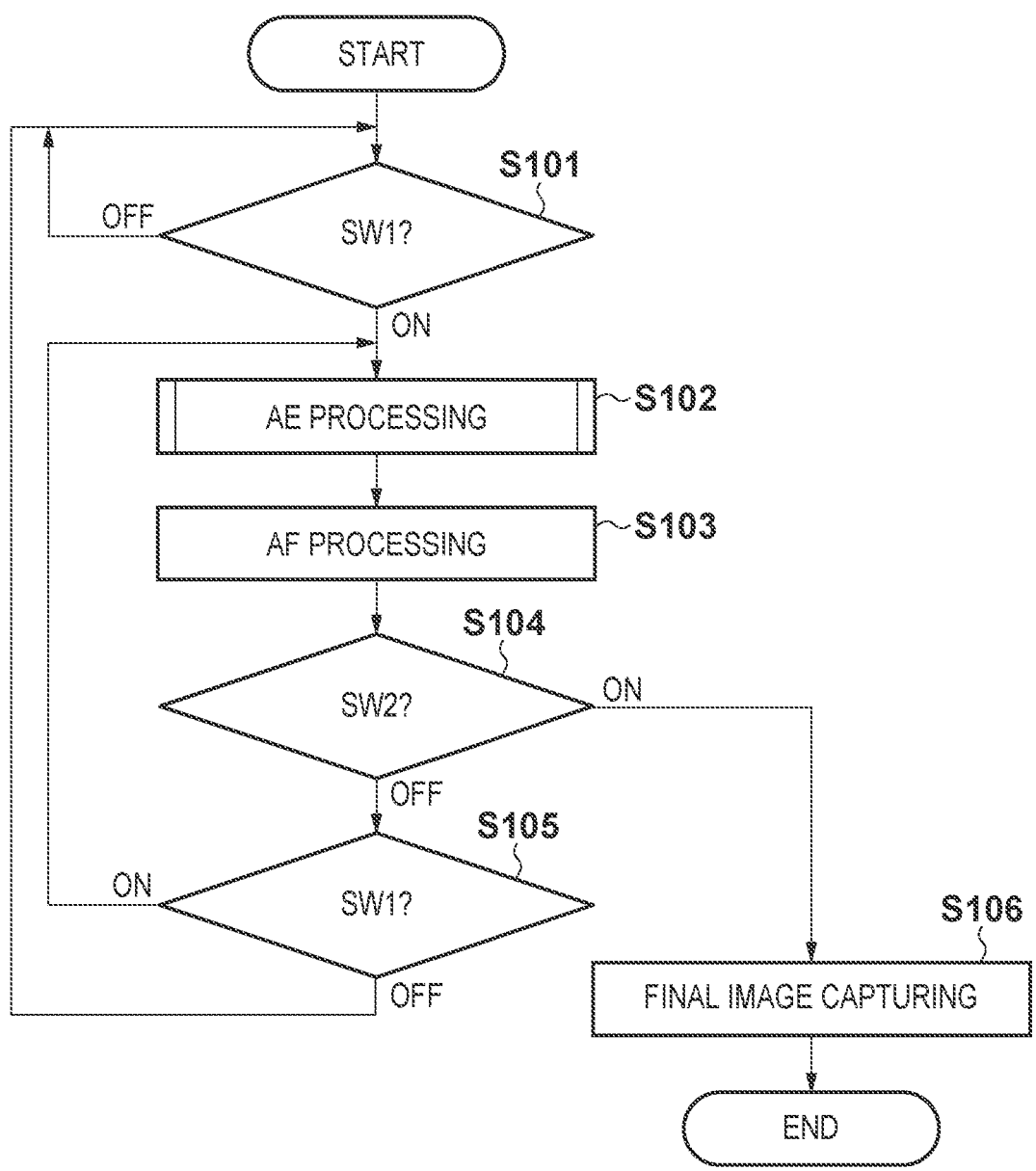
FIG. 2 is a flowchart for explaining image-capturing processing of the digital still camera according to the embodiment of the present invention.
Figure 3:
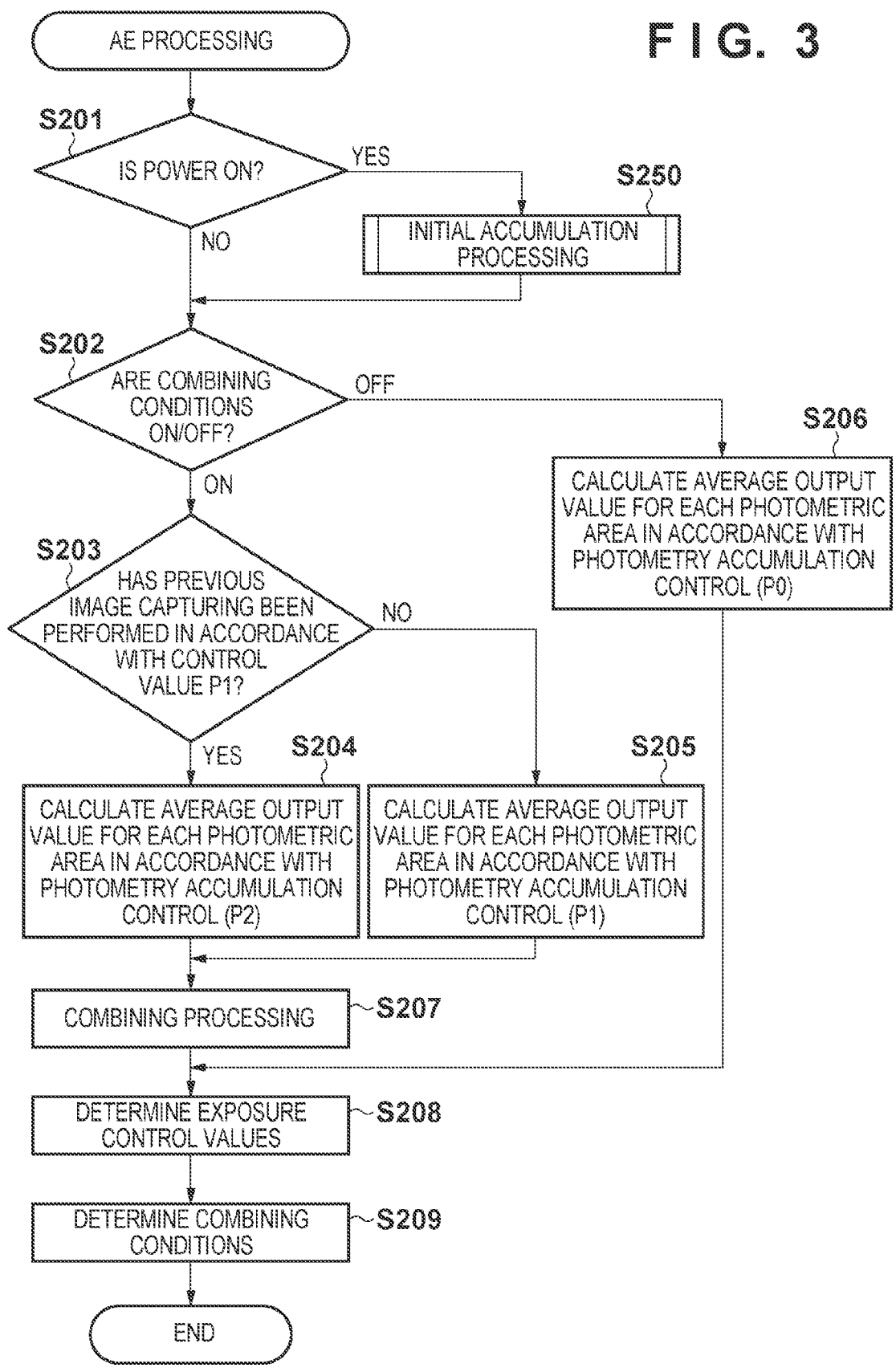
FIG. 3 is a flowchart for explaining AE processing of the digital still camera according to the embodiment of the present invention.

FIG. 3 is a flowchart showing details of the AE processing in step S102 of FIG. 2.

In step S201, the system control unit 50 determines whether the power is ON. If YES is determined in step S201, the system control unit 50 advances the process to step S250; otherwise, it advances the process to step S202.

In step S250, the system control unit 50 performs initial accumulation processing.

The initial accumulation processing will be described with reference to the flowchart shown in FIG. 4 and FIGS. 6A to 6C.

In step S301, the system control unit 50 executes photometry accumulation control (first initial accumulation operation). In the first accumulation (image-capturing) operation of the initial accumulation processing, the system control unit 50 sets an accumulation period (Tv0) and a pixel addition count (Kv0) in which the output corresponding to the luminance at the center of the photometric range required for the camera 10 has the median value of the dynamic range (the minimum output value to the maximum output value) of the image sensor 14. For example, in this embodiment, the required photometric range is Bv values of −5 to +15, so an accumulation period and a pixel addition count in which the output corresponding to a luminance of Bv=5 has the median value of the dynamic range of the image sensor 14 are set. The pixel addition count will be described later. Although the aperture set in the accumulation processing is always fully open in this embodiment, it may be set in accordance with a program diagram determined in advance.

The system control unit 50 performs photometry accumulation (image-capturing) in the set accumulation period. After the end of the set accumulation period, the system control unit 50 causes the image processing unit 20 to calculate a measured output value Y associated with the luminance from image data included in each of a plurality of photometric areas obtained by dividing the captured image. Although the photometric areas will be described in detail later with reference to FIGS. 5A to 5F, the image is divided into 6 (horizontal)×4 (vertical) photometric areas so that a total of 24 photometric areas are set. Note that the number of divided photometric areas is not limited to the above-mentioned number, and the captured image need not always be two-dimensionally equidistantly divided into photometric areas, either.

In step S302, the system control unit 50 calculates a weighted average value Yw between a weighting factor k and the measured output value Y for each photometric area, which is calculated by the image processing unit 20, as:

$$Yw=(\Sigma Yij \times kij)/24$$

where i and j are suffixes representing the positions of each photometric area. In this embodiment, 6 (horizontal)×4 (vertical) photometric areas are present, so i=0 to 5 and j=0 to 3.

Also, the weighting factor k serves to change the weight of the measured output value in each photometric area in accordance with, for example, the image-capturing mode, the photometry mode, and the type of shooting scene of the camera 10. If the photometry mode is, for example, a center-with-high-weight photometry mode, the weighting factor is set larger for photometric areas in the vicinity of the center of the image than for those on the periphery of the image. Also, if the camera 10 has a feature region detection function for a feature region such as a face, the weighting factor is set larger for photometric areas corresponding to the feature region than for other photometric areas in an image-capturing mode which uses the feature region detection function. Moreover, if the camera 10 has a scene discrimination function of automatically discriminating the type of shooting scene in accordance with the state of the field, a weighting factor optimum for the discriminated scene is set for each photometric area.

Since the weighting factor k is not directly related to the present invention, no more detailed description thereof will be given.

The system control unit 50 determines whether the second accumulation operation of the initial accumulation processing is to be performed, in accordance with $\Delta Y$ given by:

$$\Delta Y = \log_2(Yw/Ytarget)$$

where Ytarget is the target luminance, that is, the target value of the weighted average value Yw. The system control unit 50 sets exposure control values so that the weighted average value Yw is closer to the target luminance Ytarget.

If $\Delta Y$ falls within a predetermined range (e.g., falls within the range of ±3.0 steps), the system control unit 50 calculates a control value P0 in the next photometry accumulation operation in accordance with:

for $-3.0 \leq \Delta Y \leq 3.0$

P0(next photometry accumulation operation)=P0(first initial accumulation operation)+$\Delta Y$ (note that P0 (next photometry accumulation operation) is a control value used in step S206 and is not used in the second initial accumulation (image-capturing) operation), and the system control unit 50 advances the process to step S202 with no second initial accumulation (image-capturing) operation. Note that the control value P0 (first initial accumulation operation) corresponds to the accumulation period (Tv0) and the pixel addition count (Kv0) set in step S301. A control value P will be described in detail later.

On the other hand, if $\Delta Y$ falls outside the predetermined range (e.g., falls outside the range of ±3.0 steps), the system control unit 50 calculates a control value P0 (second initial accumulation operation) by changing the exposure amount in a predetermined amount (e.g., an amount corresponding to ±6 steps), and determines that the second initial accumulation (image-capturing) operation is to be performed. That is, for $-3.0 > \Delta Y$ P0(second initial accumulation operation)=P0(first initial accumulation operation)−6 for $\Delta Y > 3.0$

P0(second initial accumulation operation)=P0(first initial accumulation operation)+6

If the system control unit 50 determines in step S303 that the second initial accumulation (image-capturing) operation is to be performed, it advances the process to step S304; otherwise, it ends the initial accumulation processing (it advances the process to step S202).

In step S304, the system control unit 50 determines an accumulation period (Tv0) and a pixel addition count (Kv0) from a program diagram shown in FIG. 6A, based on the control value P0 (second initial accumulation operation) set for photometry accumulation control in the second initial accumulation operation. In an example shown in FIG. 6A, an accumulation period (Tv0)=1/100 sec and a pixel addition count (Kv0)=16 pixels for $-3.0 > \Delta Y$, and an accumulation period (Tv0)=1/25600 sec and a pixel addition count (Kv0)=0 (without pixel addition) for $\Delta Y > 3.0$.

In step S305, the system control unit 50 calculates $\Delta Y$ in the same way as in step S302 after acquisition of image data, and a control value P0 in the next photometry accumulation operation is calculated as:

for $-3.0 \leq \Delta Y \leq +3.0$ $P0$(next photometry accumulation operation)=$P0$(second initial accumulation operation)+$\Delta Y$ On the other hand, if $\Delta Y$ falls outside the range of ±3.0 steps, the exposure amount is changed in an amount corresponding to ±3 steps. That is, for $-3.0 > \Delta Y$ $P0$(next photometry accumulation operation)=$P0$(second initial accumulation operation)−3 for $\Delta Y > 3.0$ $P0$(next photometry accumulation operation)=$P0$(second initial accumulation operation)+3

When the system control unit 50 sets a control value in the next photometry accumulation operation, it ends the initial accumulation processing, and advances the process to step S202 in FIG. 3.

If the system control unit 50 determines in step S202 that combining conditions set in step S209 (to be described later) are ON, it advances the process to step S203; otherwise, it advances the process to step S206. Note that combining conditions for the initial accumulation processing result are determined in step S202 before it is determined in step S209 whether combining is to be performed. Hence, the system control unit 50 determines that the combining conditions are OFF after the initial accumulation processing, and advances the process to step S206. Instead of this, the system control unit 50 may skip the process in step S202 after the initial accumulation processing, and advance the process to step S206.

In step S203, the system control unit 50 determines whether the previous accumulation control operation has been performed in accordance with a control value P1. If YES is determined in step S203, the system control unit 50 advances the process to step S204; otherwise, it advances the process to step S205. Control values P1 and P2 are obtained by changing the exposure amount by +2 and −2 steps, respectively, with reference to the control value P0.

In step S204, the system control unit 50 determines an accumulation period (Tv2) and a pixel addition count (Kv2) based on the control value P2, and performs photometry accumulation processing. After accumulation, the system control unit 50 divides the captured image into a plurality of photometric areas, and calculates a measured output value Y for each photometric area.

In step S205, the system control unit 50 determines an accumulation period (Tv1) and a pixel addition count (Kv1) based on the control value P1, and performs photometry accumulation processing. After accumulation, the system control unit 50 divides the captured image into a plurality of photometric areas, and calculates a measured output value Y for each photometric area.

In step S206, the system control unit 50 determines an accumulation period (Tv0) and a pixel addition count (Kv0) based on the control value P0, and performs photometry accumulation processing. After accumulation, the system control unit 50 divides the captured image into a plurality of photometric areas, and calculates a measured output value Y for each photometric area. Note that the control value P0 (next photometry accumulation operation) calculated in the initial accumulation processing is used at this time.

In step S207, the system control unit 50 aligns the levels of the previously calculated measured output value Y and the measured output value Y calculated at this time in two different steps S204 to S206, and then performs combining processing to calculate a measured output value Y upon widening of the photometric range for each photometric area. Note that the combining processing will be described in detail later with reference to FIG. 7.

In step S208, the system control unit 50 calculates a weighted average value Yw between the weighting factor k and the measured output value Y for each photometric area, which is calculated in step S206 or S207. The system control unit 50 determines exposure control values (e.g., the shutter speed, the f-number, and the sensitivity) in final image capturing, based on the object luminance obtained from the weighted average value Yw, the accumulation period, and the pixel addition count. Note that since a method of determining exposure control values is not directly related to the present invention, and can be an arbitrary method, a detailed description thereof will not be given.

In step S209, the system control unit 50 determines combining conditions indicating whether the measured output values are to be combined in the next AE processing operation, based on the weighted average value Yw calculated in step S208. A method of determining whether the measured output values are to be combined will be described in detail later.

A method of calculating a pixel addition count and a measured output value Y will be described next with reference to FIGS. 5A to 5F.

The image sensor 14 of the camera 10 according to this embodiment includes primary color filters, and each pixel has spectral characteristics corresponding to R (Red), G (Green), or B (Blue). Also, the image sensor 14 is assumed to have 96 (horizontal)×64 (vertical) pixels, for the sake of easy explanation and understanding.

FIG. 5A schematically shows the state in which image data read out from the image sensor 14 by controlling the image sensor 14 using the image sensor control unit 41 is written in the memory 30 via the A/D converter 16 and memory control unit 21.

FIG. 5B illustrates an example in which an image having 96 (horizontal)×64 (vertical) pixels is divided into a total of 6 (horizontal)×4 (vertical)=24 photometric areas 200. One photometric area includes 16×16 pixels of the image sensor 14.

FIG. 5C is an enlarged view of one photometric area 200. In this case, FIG. 5C shows a pixel arrangement when the image sensor 14 includes color filters arranged in a Bayer pattern. Note that since the present invention does not depend on the arrangement of color filters, other pixel arrangements may be adopted.

The image sensor control unit 41 sets the range of the image sensor (or the image), in which outputs from pixels of the same color are added.

Figure 5E:
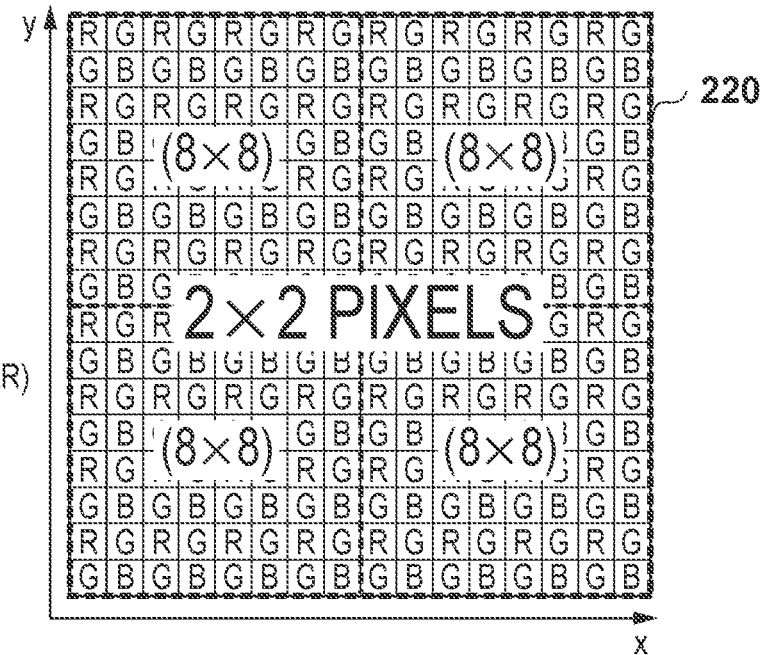
Figure 5F:
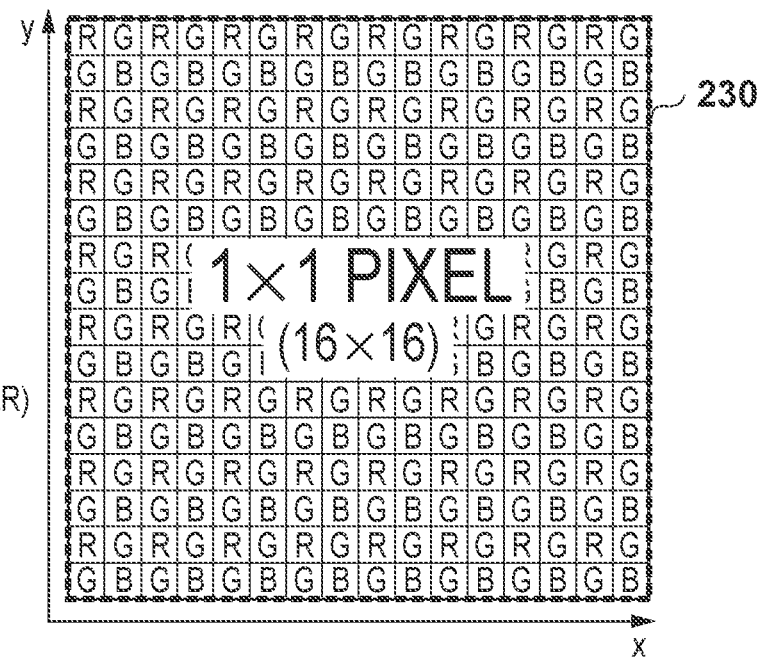

For example, FIGS. 5D to 5F illustrate examples in which pixel addition ranges 210, 220, and 230 in which 4×4 pixels, 8×8 pixels, and 16×16 pixels, respectively, are added are set in the photometric area shown in FIG. 5C.

Pixel signals of respective colors in a unit arrangement of 2×2 color filters (R, G1, B, and G2) are added four times, 16 times, and 64 times in the pixel addition ranges 210, 220, and 230, respectively, to obtain a set of sums of R, G1, B, and G2 for each addition range.

The accumulation period to obtain the same output from the image sensor 14 in the same field (in the same scene) has values of ¼, ¹⁄₁₆, and ¹⁄₆₄ when the pixel addition ranges 210, 220, and 230, respectively, are set upon defining, as 1, the value of the accumulation period, within which no pixel signals are added. Therefore, prolongation of the accumulation period at a low luminance can be suppressed by increasing the pixel addition count (setting a relatively wide pixel addition range).

The average values of R, G (G1 and G2), and B are calculated in each photometric area to yield a measured output value Y as:

$$Y=0.299 \times R+0.587 \times G+0.114 \times B$$

In this manner, combining processing (to be described later) can be performed by calculating one measured output value Y for each photometric area, independently of the addition range. Note that instead of calculating one measured output value Y for each photometric area, one measured output value Y may be calculated for each addition range and used as the output value from the pixels within this addition range.

A method of controlling the accumulation period and the pixel addition count will be described next with reference to FIG. 6A.

FIG. 6A illustrates an example of a program diagram that shows the accumulation period on the abscissa and the pixel addition count on the ordinate for the Bv value in the field.

In this case, the sum (Tv+Kv) of the accumulation period (Tv) and the pixel addition count (Kv) is defined as a control value (exposure amount) P. Note that the sum of the accumulation period (Tv) and the pixel addition count (Kv) means herein the sum of APEX values, and therefore does not mean the sum of an actual accumulation period (e.g., 1/100 sec) and an actual pixel count (e.g., 16 pixels). Tv(APEX) and Kv(APEX) corresponding to a specific accumulation period and pixel addition count are determined in advance so as to satisfy P(APEX)=Tv(APEX)+Kv(APEX). See, for example, "APEX in Appendix C" of "Digital Still Camera Image File Format Standard (Exif) Version 2.1" for details regarding APEX units.

Upon determination of the control value P, Tv and Kv are determined based on program diagrams shown in FIGS. 6A to 6C.

At a low luminance at which the Bv value is relatively small, the accumulation period required to obtain a given exposure amount is relatively long. If the required accumulation period is longer than or equal to a predetermined accumulation period (1/100 sec or more in FIGS. 6A to 6C), the system control unit 50 increases the pixel addition count to compensate for a deficient exposure amount in capturing an image in the predetermined accumulation period. Only when a deficient exposure amount cannot be compensated for even if the pixel addition count is maximum (64 pixels in FIGS. 6A to 6C), an accumulation period longer than the predetermined accumulation period (an accumulation period longer than 1/100 sec) is set. At a high luminance at which a given exposure amount can be obtained in an accumulation period shorter than the predetermined accumulation period, no pixel signals are added. Although 1/100 sec is set as the predetermined accumulation period, an accumulation period different from 1/100 sec may be set as the predetermined accumulation period. Alternatively, an accumulation period which varies depending on, for example, the image-capturing mode of the camera may be set.

Combining processing of the measured output values Y will be described next with reference to FIGS. 6A to 6C and 7.

The generally required photometric range is Bv values of about −5 to +15, that is, it corresponds to a dynamic range of about 20 steps, as described above. However, the dynamic range of the image sensor 14 in this embodiment (the range of the luminance, in which photometry can be performed by one-time accumulation) is narrower than 20 steps.

Hence, in this embodiment, a control value (a control value at which the median value of the output value from the image sensor 14 can be obtained when exposure is performed based on this control value) at which the output corresponding to the weighted average value of the measured output values is the center of the dynamic range of the image sensor 14 is defined as a control value P0. Also, control values P1 and P2 are obtained by changing the exposure amount by +2 and −2 steps, respectively, with reference to the control value P0.

FIG. 6B is a program diagram for the control values P0 and P1, and FIG. 6C is a program diagram for the control value P2.

The points P0, P1, and P2 in the program diagrams shown in FIGS. 6B and 6C indicate the control values when a Bv value=5 in the field of view. The point P0 corresponds to an accumulation period of 1/400 sec, without pixel addition; and the points P1 and P2 correspond to the same accumulation period of 1/1600 sec, without pixel addition and with the addition of 16 pixels, respectively.

In photometry according to this embodiment, the photometric range, that is, the dynamic range of the image sensor 14 is widened by alternately repeating accumulation control which uses the control values P1 and P2 according to which the accumulation period and the pixel addition count are controlled.

Figure 7:
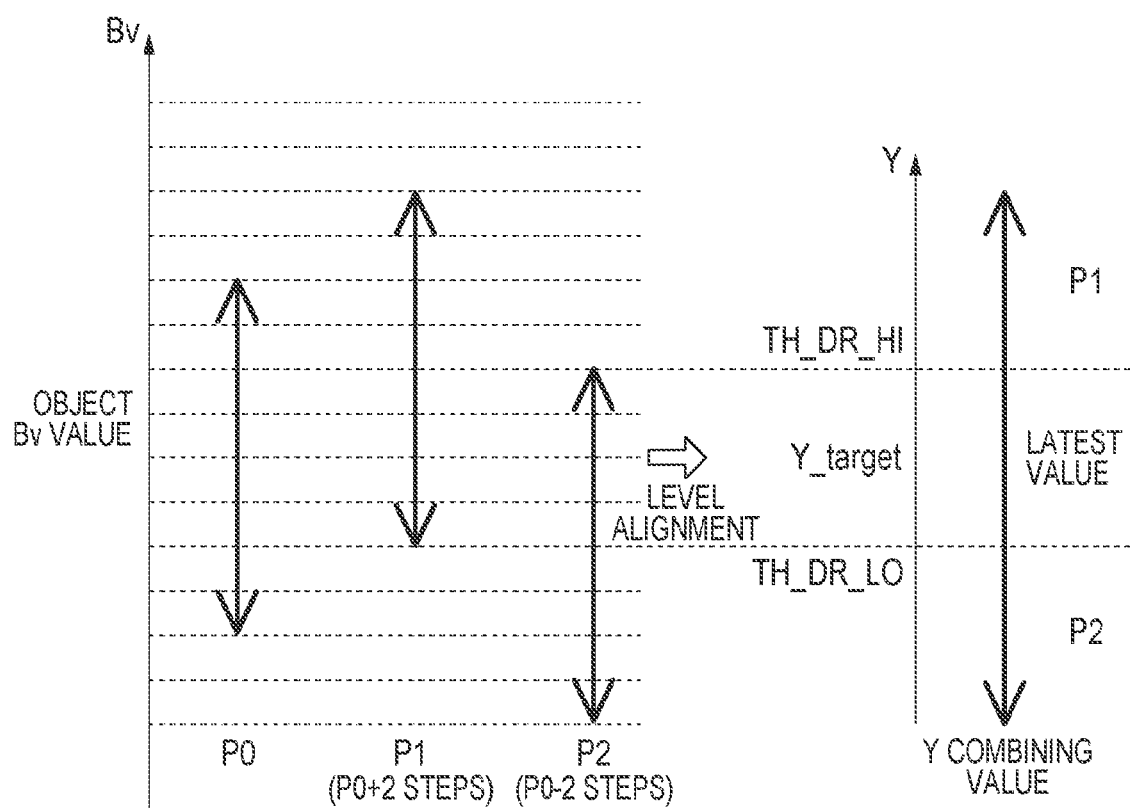
FIG. 7 is a view for explaining processing of combining the measured output values obtained in the AE processing of the digital still camera according to the embodiment of the present invention.

FIG. 7 shows the range in which photometry can be performed by capturing images using the image sensor 14 in accordance with the control values P0, P1, and P2 for the Bv value in the field.

Also, a Y combining value shown in FIG. 7 is obtained by combining processing after aligning the levels of the measured output values Y for each photometric area, which are obtained in accordance with the control values P1 and P2. Note that the luminance in the field varies between accumulation control (image capturing) which uses the control value P1 and that which uses the control value P2. If the control value P0 changes, the amount of change is reflected on the levels to be aligned.

Level alignment is done using thresholds TH_DR_HI and TH_DR_LO. The threshold TH_DR_HI corresponds to the upper limit of the Bv value in the photometry possible range at the control value P2, and the threshold TH_DR_LO corresponds to the lower limit of the Bv value in the photometry possible range at the control value P1.

In level alignment, the measured output values for the same Bv value are equalized. For example, the measured output value obtained by accumulation control in accordance with the control value P2 is corrected to be equal to that obtained by accumulation control in accordance with the control value P1. More specifically, when the control value P1 corresponds to a case without pixel addition, and the control value P2 corresponds to an addition of 16 pixels, the measured output value obtained by accumulation control in accordance with the control value P2 is corrected to 1/16. This maintains continuity in relationship between the Bv value and measured output value in the photometric range after combining.

After the levels of the measured output values are aligned, the system control unit 50 performs combining processing under the following conditions.

If the measured output value Y obtained from an image captured in accordance with the control value P1 is larger than the threshold TH_DR_HI, it is used as a value after combining.

If the measured output value Y obtained from an image captured in accordance with the control value P2 is smaller than the threshold TH_DR_LO, it is used as a value after combining.

If both the measured output value Y obtained from an image captured in accordance with the control value P1 and that obtained from an image captured in accordance with the control value P2 are between the threshold TH_DR_LO (inclusive) and the threshold TH_DR_HI (inclusive), the measured output value Y based on a new captured image is used as a value after combining. This is because the measured output value Y based on a new captured image more considerably reflects the luminance of the current field. Note that the average value between the measured output value Y obtained from an image captured in accordance with the control value P1 and that obtained from an image captured in accordance with the control value P2 may be used as a value after combining. Using this average value as a value after combining, the influence of a temporal change in luminance can be suppressed.

By the processing described above, the photometry possible range can be widened by about 4 steps (±2 steps), compared to that based on the control value P0.

Also, when a plurality of control values Pn are set in addition to the control values P1 and P2, the photometry possible range can be widened by level alignment and combining processing for each photometric area.

Although an example in which the measured output values Y for each photometric area, which are obtained in accordance with the control values P1 and P2, are combined has been described with reference to FIG. 7, the same applies when the measured output value Y obtained in accordance with the control value P1 or P2 and that obtained in accordance with the control value P0 are combined.

A method of determining in step S209 whether combining is to be performed will be described next.

In step S209, the system control unit 50 determines based on the photometry result whether combining processing is to be performed in the next photometry accumulation operation. If combining is to be performed in the next photometry accumulation operation, the combining conditions are set ON. If combining is not to be performed in the next photometry accumulation operation, the combining conditions are set OFF.

In step S208, the system control unit 50 calculates a weighted average value Yw between the weighting factor k and the measured output value Y for each photometric area is calculated to yield the number of steps $\Delta Y$ corresponding to the difference between the target luminance Ytarget and the weighted average value Yw as:

$$\Delta Y = \log_2(Yw/Ytarget)$$

If $\Delta Y$ falls within the range of ±3.0, the luminance is not expected to have considerably changed in the field, and the system control unit 50 sets the next image-capturing parameters to perform combining processing in the next photometry accumulation operation in step S209 as:

for $-3.0 \leq \Delta Y \leq +3.0$

P0(next photometry accumulation operation)=P0(previous photometry accumulation operation)+$\Delta Y$ P1(next photometry accumulation operation)=P0(next photometry accumulation operation)+2

P2(next photometry accumulation operation)=P0(next photometry accumulation operation)−2 next combining conditions: ON

On the other hand, if $\Delta Y$ does not fall within the range of ±3.0 steps, the luminance is expected to have considerably changed in the field, and the next image-capturing parameters are set to capture an image in accordance with the control value P0 without combining processing in the next photometry accumulation operation as:

for $-3.0 > \Delta Y$

P0(next photometry accumulation operation)=P0(previous photometry accumulation operation)−3 next combining conditions: OFF for $\Delta Y > 3.0$

P0(next photometry accumulation operation)=P0(previous photometry accumulation operation)+3 next combining conditions: OFF

As described above, according to this embodiment, the photometry possible range can be widened when photometry is performed by capturing images by a plurality of times using different exposure amounts, compared to that when photometry is performed by one-time image capturing. Also, when an accumulation period longer than or equal to a predetermined period is required to perform image capturing for photometry in a low-luminance region, images are captured upon setting of the accumulation period to the predetermined period, and a measured output value is calculated based on an addition pixel signal, thereby suppressing prolongation in time required for photometry, and widening the photometry possible range.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although photometry is performed using an image sensor which captures a recording image in the above-mentioned embodiment, the present invention may be applied when photometry is performed using a charge-accumulation type image sensor provided separately from an image sensor which captures a recording image.

Also, a configuration which allows the user to operate operational devices (not shown) so as to determine whether the processing described in the above-mentioned embodiment is to be performed may be adopted, or that which performs the processing described in the above-mentioned embodiment only when the user operates an operation means (not shown) so as to select a predetermined mode among a plurality of modes may be adopted.

Moreover, at a low luminance, if the accumulation period is set longer than a predetermined accumulation period in order to obtain an appropriate exposure amount, the period required for photometry is extended if a plurality of photometry accumulations are performed. Therefore, in such a case, both a plurality of photometry accumulations as well as combining processing may be omitted.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

This application claims the benefit of Japanese Patent Application No. 2011-084079, filed on Apr. 5, 2011, which is hereby incorporated by reference herein in its entirety.

What is claimed is:

1. An image-capturing apparatus comprising:
    an image sensor including a plurality of pixels;
    a photometry calculation unit which calculates a photometric value for each of a plurality of photometric areas, based on image data obtained by using the image sensor; and
    an exposure calculation unit which calculates an exposure control value based on the respective photometric values calculated by the photometry calculation unit for the plurality of photometric areas,
    wherein the photometry calculation unit calculates, for each of the plurality of photometric areas, a first photometric value based on first image data obtained by using the image sensor, and a second photometric value, for each of the plurality of photometric areas, based on second image data obtained by using the image sensor,
    wherein a pixel signal of the first image data is obtained without or with adding pixel signals and a pixel signal of the second image data is obtained by adding a number of pixel signals larger than the number of pixel signals added to obtain a pixel signal of the first image data,
    wherein the exposure calculation unit calculates the exposure control value based on the first photometric values and the second photometric values corrected to be equal to the first photometric values for a predetermined luminance, and
    wherein pixel signals within a same photometric area are added to obtain the first image data or the second image data.

2. The apparatus according to claim 1, wherein
    in calculating the exposure control value based on the first and second photometric values for the plurality of photometric areas, the exposure calculation unit uses the first photometric values as photometric values in high-luminance regions, and uses the second photometric values as photometric values in low-luminance regions.

3. The apparatus according to claim 1, wherein
    in calculating the exposure control value based on the first and second photometric values for the plurality of photometric areas, the exposure calculation unit uses the first photometric values for photometric areas in which the first photometric value is larger than a first predetermined value among the plurality of photometric areas, and uses the second photometric values for photometric areas in which the second photometric value is smaller than a second predetermined value among the plurality of photometric areas.

4. The apparatus according to claim 3, wherein the exposure calculation unit uses photometric values calculated based on newer image data, of the first photometric values and the second photometric values, for photometric areas in which both the first photometric value and the second photometric value are not less than the second predetermined value and are not more than the first predetermined value among the plurality of photometric areas.

5. The apparatus according to claim 1, wherein the first image data and the second image data are alternately read out from the image sensor.

6. The apparatus according to claim 1, wherein the first image data is obtained without adding a plurality of pixel signals.

7. The apparatus according to claim 1, further comprising a determination unit which determines whether the first image data or the second image data is to be obtained, based on the photometric values calculated by the photometry calculation unit.

8. The apparatus according to claim 1, wherein an accumulation period required for the image sensor to acquire the first image data is equal to an accumulation period required for the image sensor to acquire the second image data.

9. A method of controlling an image-capturing apparatus, comprising:
    a photometry calculation step of calculating a photometric value for each of a plurality of photometric areas, based on image data obtained by using an image sensor including a plurality of pixels; and
    an exposure calculation step of calculating an exposure control value based on the respective photometric values calculated in the photometry calculation step for each of a plurality of photometric areas,
    wherein, in the photometry calculation step, for each of the plurality of photometric areas, a first photometric value is calculated based on first image data obtained by using the image sensor and a second photometric value is calculated based on second image data obtained by using the image sensor,
    wherein a pixel signal of the first image data is obtained without or with adding pixel signals and a pixel signal of the second image data is obtained by adding a number of pixel signals larger than the number of pixel signals added to obtain a pixel signal of the first image data,
    wherein, in the exposure calculation step, the exposure control value is calculated based on the first photometric values and the second photometric values corrected to be equal to the first photometric values for a predetermined luminance, and
    wherein pixel signals within a same photometric area are added to obtain the first image data or the second image data.

10. An image-capturing apparatus comprising:
    an image sensor including a plurality of pixels;
    a photometry calculation unit which calculates a photometric value based on image data read out from the image sensor; and
    an exposure calculation unit which calculates an exposure control value based on the photometric value calculated by the photometry calculation unit,
    wherein the exposure calculation unit calculates the exposure control value based on a first photometric value calculated based on first image data read out from the image sensor and a second photometric value calculated based on second image data read out from the image sensor,
    wherein a pixel signal of the first image data is obtained without or with adding pixel signals and a pixel signal of the second image data is obtained by adding a number of pixel signals larger than the number of pixel signals added to obtain a pixel signal of the first image data, and
    wherein the exposure calculation unit calculates the exposure control value based on the first photometric value and the second photometric value corrected to be equal to the first photometric value for a predetermined luminance.

11. A method for controlling an image-capturing apparatus, comprising:
- a photometry calculation step of calculating a photometric value based on image data read out from an image sensor including a plurality of pixels; and
- an exposure calculation step of calculating an exposure control value based on the photometric value calculated in the photometry calculation step,
- wherein, in the exposure calculation step, the exposure control value is calculated based on a first photometric value calculated based on first image data read out from the image sensor and a second photometric value calculated based on second image data read out from the image sensor,
- wherein a pixel signal of the first image data is obtained without or with adding pixel signals and a pixel signal of the second image data is obtained by adding a number of pixel signals larger than the number of pixel signals added to obtain a pixel signal of the first image data, and
- wherein, in the exposure calculation step, the exposure control value is calculated based on the first photometric value and the second photometric value corrected to be equal to the first photometric value for a predetermined luminance.

* * * * *